(12) United States Patent
Shen et al.

(10) Patent No.: US 12,741,426 B2
(45) Date of Patent: Sep. 22, 2026

(54) THERMOPLASTIC COMPOSITE COMPONENT WITH VIBRATION WELDED NON-PARALLEL SURFACES AND METHOD FOR PRODUCING THE SAME

(71) Applicant: Rohr, Inc., Chula Vista, CA (US)

(72) Inventors: Shyan Bob Shen, San Diego, CA (US); Michael van Tooren, San Diego, CA (US); Jeffrey D. Woods, Beaumont, CA (US); Alan Phillips, Ballynahinch (GB)

(73) Assignee: Rohr, Inc., Chula Vista, CA (US)

( * ) Notice: Subject to any disclaimer, the term of this patent is extended or adjusted under 35 U.S.C. 154(b) by 503 days.

(21) Appl. No.: 18/092,886

(22) Filed: Jan. 3, 2023

(65) Prior Publication Data

US 2024/0217183 A1 Jul. 4, 2024

(51) Int. Cl.
*B29C 65/06* (2006.01)
*B29C 65/00* (2006.01)

(52) U.S. Cl.
CPC ........ *B29C 65/0609* (2013.01); *B29C 66/131* (2013.01)

(58) Field of Classification Search
CPC ... B29C 65/0609; B29C 66/131; B29C 66/71; B29C 66/712; B29C 66/72141; B29C 65/7802; B29C 66/12821; B29C 66/1284; B29C 66/524; B29C 66/532; B29C 66/721; B29C 66/73921; B29C 65/0618; B29C 65/7805; B29C 65/7835; B29C 65/06
See application file for complete search history.

(56) References Cited

U.S. PATENT DOCUMENTS 4,778,637 A * 10/1988 Adams .................. F16B 33/006 470/9
9,751,477 B2 9/2017 Iwano
(Continued)

FOREIGN PATENT DOCUMENTS

CN 108857112 A 11/2018
FR 2872779 A1 * 1/2006 ............... B64C 1/18

OTHER PUBLICATIONS

Stokes, "Vibration Welding of Thermoplastics. Part I: Phenomenology of the Welding Process", Poly. Eng. Sci., vol. 20, No. 11, pp. 718-727, Jun. 1988) (Year: 1988).*
(Continued)

*Primary Examiner* — Christopher W Raimund
(74) *Attorney, Agent, or Firm* — Getz Balich LLC

(57) ABSTRACT

A method for joining thermoplastic composite includes: providing a first part having a first joining surface disposed in a first plane and a second joining surface disposed in a second plane that is non-parallel to the first plane; providing a second part having a third joining surface disposed in the first plane and a fourth joining surface disposed in the second plane; disposing the parts so that the first and third joining surfaces are in contact with one another, and the second and fourth joining surfaces are in contact with one another; forcing the second and fourth joining surfaces against one another; and welding the first and third joining surfaces together using a vibration welding process, wherein the welding process and the forcing of the second and fourth joining surfaces against one another causes the second and fourth joining surfaces to be welded.

5 Claims, 3 Drawing Sheets

(56) References Cited

U.S. PATENT DOCUMENTS

| | | | | |
|---|---|---|---|---|
| 11,104,082 | B2 | 8/2021 | Jones | |
| 2007/0084539 | A1* | 4/2007 | Junker | B23K 20/1205 228/110.1 |
| 2014/0191492 | A1 | 7/2014 | Al-Sheyyab | |
| 2016/0001394 | A1 | 1/2016 | Stumpf | |
| 2019/0232903 | A1 | 8/2019 | Newcomb | |
| 2019/0389143 | A1 | 12/2019 | Kimura | |
| 2022/0410496 | A1 | 12/2022 | Glavaski | |

OTHER PUBLICATIONS

EP search report for EP24150258.2 dated Jun. 5, 2024.

* cited by examiner 22
48
20
48
22
26
26
Z
24
24
46
42
32
42
46
X
Y
36
28

THERMOPLASTIC COMPOSITE COMPONENT WITH VIBRATION WELDED NON-PARALLEL SURFACES AND METHOD FOR PRODUCING THE SAME

BACKGROUND OF THE INVENTION

1. Technical Field

The present disclosure relates to thermoplastic composite components and methods for producing the same in general, and to thermoplastic composite components and methods for welding surfaces of the same using vibration welding in particular.

2. Background Information

Components made from thermoplastic composite materials are increasingly in demand in the aircraft industry and other industries as a result of the wide-ranging advantages of these materials. Thermoplastic composite materials can be used to form lightweight and high-strength structures having complex shapes. In addition, thermoplastic composite materials, as compared to thermoset materials, offer extended shelf life, the ability to be recycled/reformed, improved damage tolerance properties, as well as moisture and chemical resistance.

Components made from a plurality of thermoplastic composite parts often include thermoplastic composite parts that are joined together. Vibration welding is one technique that can be used to join thermoplastic composite parts. Vibration welding uses heat energy generated when one component is held stationary while the other component is moved in a linear, back-and-forth motion. The heat generated initiates a controllable meltdown at the interface of the components. Existing vibration welding processes require the component part interface to accommodate the relative motion inherent in the process. For example, existing vibration welding processes of which we are aware do not permit welding in multiple non-parallel surfaces (e.g., perpendicular surfaces) in a single process. Hence, existing vibration welding processes are limited to certain component geometries.

What is needed is a vibration welding process capable of welding non-parallel surfaces.

SUMMARY OF THE INVENTION

According to an aspect of the present disclosure, a method for joining thermoplastic composite parts is provided that includes: providing a first part having at least one first joining surface disposed in a first plane and at least one second joining surface disposed in a second plane that is non-parallel to the first plane, the first part comprising a first thermoplastic composite material; providing a second part having at least one third joining surface disposed in the first plane and at least one fourth joining surface disposed in the second plane, the second part comprising a second thermoplastic composite material; disposing the first part relative to the second part so that the at least one first joining surface and the at least one third joining surface are in contact with one another, and the at least one second joining surface and the at least one fourth joining surface are in contact with one another; forcing the at least one second joining surface and the at least one fourth joining surface against one another; and welding the at least one first joining surface and the at least one third joining surface together using a vibration welding process that includes subjecting one of the first part or the second part to oscillatory motion; wherein the oscillatory motion and the forcing of the at least one second joining surface and the at least one fourth joining surface against one another causes the at least one second joining surface and the at least one fourth joining surface to be welded.

In any of the aspects or embodiments described above and herein, the forcing of the at least one second joining surface and the at least one fourth joining surface against one another may include placing the first part and the second part in an interference fit relative to the other of the first part and second part.

In any of the aspects or embodiments described above and herein, the at least one second joining surface may be biased against the at least one fourth joining surface.

In any of the aspects or embodiments described above and herein, the first plane and the second plane may be disposed in the range of seventy to one hundred and ten degrees relative to one another.

In any of the aspects or embodiments described above and herein, the first plane and the second plane may be perpendicular.

In any of the aspects or embodiments described above and herein, the first thermoplastic composite material may be the same as the second thermoplastic composite material.

In any of the aspects or embodiments described above and herein, the first thermoplastic composite material may be different than the second thermoplastic composite material.

In any of the aspects or embodiments described above and herein, at least one of the first thermoplastic composite material or the second thermoplastic composite material may include continuous fiber reinforcement.

In any of the aspects or embodiments described above and herein, the at least one first joining surface and the at least one third joining surface may be welded concurrently with the welding of the at least one second joining surface and the at least one fourth joining surface.

In any of the aspects or embodiments described above and herein, in a single process the at least one first joining surface and the at least one third joining surface are welded, and the at least one second joining surface and the at least one fourth joining surface are welded.

In any of the aspects or embodiments described above and herein, the first thermoplastic composite material may comprise at least one of polyamide (PA), polyamide-imide (PAI), polyarylsulfone (PAS), polyethersulfone (PES), polyoxymethylene (POM), polyphenylene sulphide (PPS), polyether ether ketone (PEEK), polyetherimide (PEI), polyethylene terephthalate (PET), polyphthalamide (PPA), poly ether ketone ketone (PEKK), or poly aryl ether ketone (PAEK).

In any of the aspects or embodiments described above and herein, the second thermoplastic composite material may comprise at least one of polyamide (PA), polyamide-imide (PAI), polyarylsulfone (PAS), polyethersulfone (PES), polyoxymethylene (POM), polyphenylene sulphide (PPS), polyether ether ketone (PEEK), polyetherimide (PEI), polyethylene terephthalate (PET), polyphthalamide (PPA), poly ether ketone ketone (PEKK), or poly aryl ether ketone (PAEK).

In any of the aspects or embodiments described above and herein, the first thermoplastic composite material may comprise at least one of glass fibers, carbon fibers, aramid fibers, basalt fibers, mineral fibers, fibers from renewable raw materials, metal fibers or polymer fibers.

In any of the aspects or embodiments described above and herein, the second thermoplastic composite material may comprise at least one of glass fibers, carbon fibers, aramid fibers, basalt fibers, mineral fibers, fibers from renewable raw materials, metal fibers or polymer fibers.

According to another aspect of the present disclosure, a thermoplastic composite component is provided that includes a first part and a second part. The first part has at least one first joining surface disposed in a first plane and at least one second joining surface disposed in a second plane that is non-parallel to the first plane. The first part comprises a first thermoplastic composite material. The second part has at least one third joining surface disposed in the first plane and at least one fourth joining surface disposed in the second plane. The second part comprises a second thermoplastic composite material. In a single process, the at least one first joining surface and the at least one third joining surface are welded together with a vibration weld, and the at least one second joining surface and the at least one fourth joining surface are welded together with a vibration weld.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Referring to FIGS. 1-6, components made from thermoplastic composite materials are utilized in a variety of different applications, including aircraft interior cabin components, and the like. The term "thermoplastic composite material" as used herein includes composite materials that include a thermoplastic matrix and a reinforcing material. The reinforcing material may include continuous or non-continuous fibers. The present disclosure is not limited to any particular type of thermoplastic matrix material, or any particular type of reinforcing material, or any fiber configuration. Many of these components have three-dimensional (3D) configurations that may be arrived at by combining a plurality of thermoplastic composite parts together to form the 3D configuration. Vibration welding is a desirable method for joining thermoplastic composite parts in many instances for numerous reasons; e.g., the process is less prone to warpage than many other joining methods, it has a short cycle time, and it is energy efficiency. A limitation of existing vibration welding techniques is that they do not permit concurrent welding of non-parallel surfaces; e.g., surfaces that are substantially perpendicular to one another cannot be welded at the same time/in a single process. The present disclosure provides an improved vibration welding process that can be used with thermoplastic composite materials to produce a first pair of joined surfaces and a second pair of joined surfaces where the joining planes of the first and second pairs of joined surfaces are non-parallel to one another. For preferred results, the non-parallel surfaces are close to perpendicular but it is not required that the non-parallel surfaces be perpendicular. For example, surfaces that are in the range of between about seventy to one hundred and ten degrees (70°-110°) can be satisfactorily joined using the present disclosure.

The present disclosure method may or may not include a surface preparation step. In some instances, the surfaces to be joined may benefit from some amount of preparation prior to the joining process. For example, in some applications it may be beneficial to subject a surface to be joined to a cleaning process that cleans the surface of any debris and/or contaminants that may be present. Embodiments of the present disclosure do not require a surface preparation process.

Figures 1, 1A:
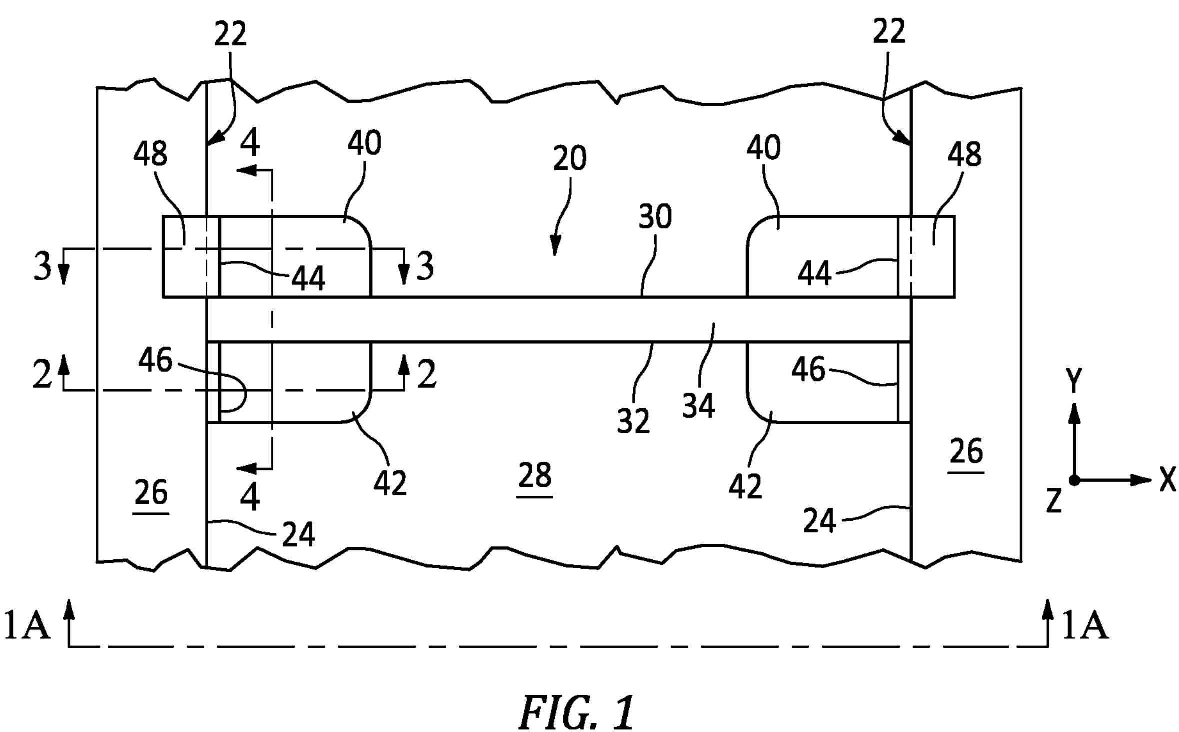
FIG. 1 is a diagrammatic representation of thermoplastic composite parts to be joined together as part of a component.
FIG. 1A is an end view of the thermoplastic composite parts shown in FIG. 1 as shown by arrows 1A.
Figure 2:
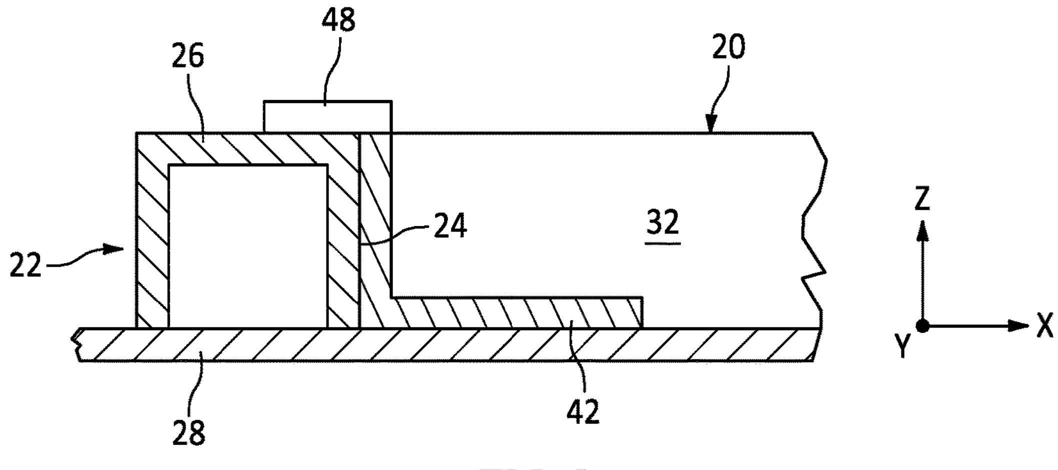
FIG. 2 is a partial sectional view of the thermoplastic composite parts shown in FIG. 1 along cut line 2-2.
Figure 3:
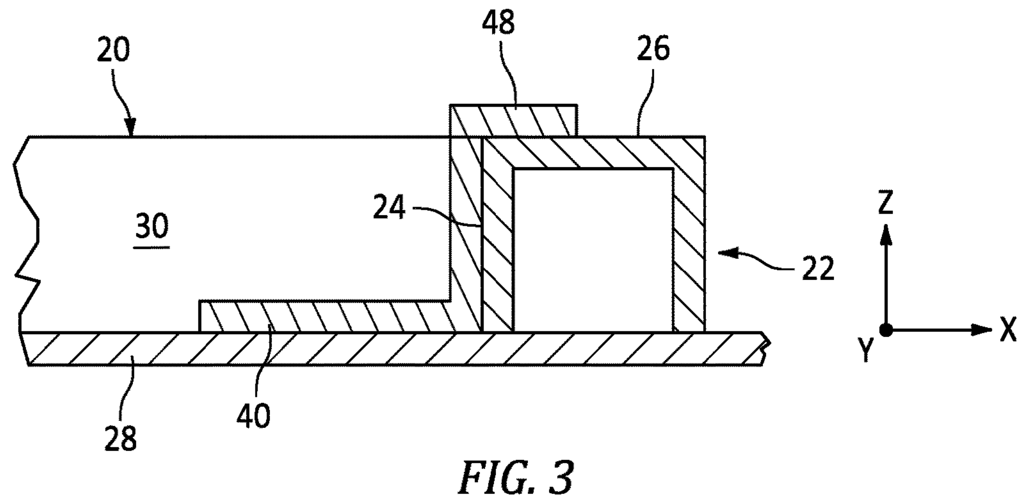
FIG. 3 is a partial sectional view of the thermoplastic composite parts shown in FIG. 1 along cut line 3-3.
Figure 4:
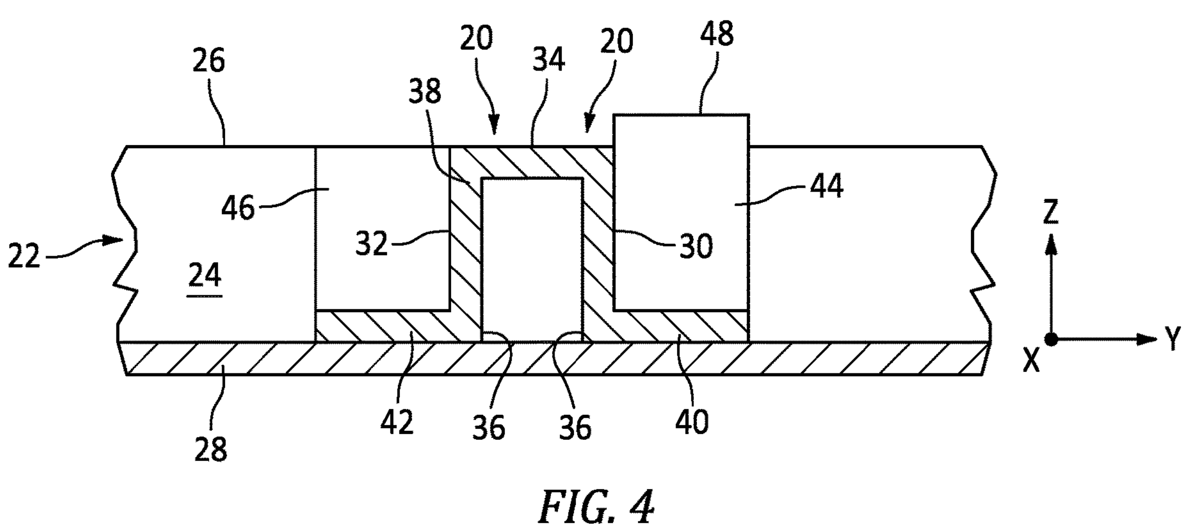
FIG. 4 is a partial sectional view of the thermoplastic composite parts shown in FIG. 1 along cut line 4-4.

Referring to FIGS. 1 and 1A, a cross member 20 is shown disposed between two rails 22. The cross member 20 comprises a thermoplastic composite material that includes a thermoplastic matrix and fiber reinforcement, and may include continuous fiber reinforcement. The rails 22 may be described as extending along a Y-axis. Each rail 22 may be described as having a height (Z-axis), a width (X-axis), an interior side surface 24, and a top surface 26. The cross member 20 may be described as extending along an X-axis. A back panel (BP) 28 extends between and is joined to the rails 22. The height of each rail 22 extends outwardly (Z-axis) from the back panel 28. The back panel 28 may be described as extending in an X-Y plane, where X, Y, and Z are orthogonal axes. In this example, the rails 22 are parallel one another. The rails 22 and the back panel 28 comprise a thermoplastic composite material that includes a thermoplastic matrix and fiber reinforcement, and may include continuous fiber reinforcement.

The cross member 20, the rails 22, and the back panel 28 may comprise the same thermoplastic composite material or one or more of the same may comprise a different thermoplastic composite material than the others. Nonlimiting examples of "different" thermoplastic composite materials include a first material having a first type of thermoplastic matrix and a second material having a second type of thermoplastic matrix, a first material having a first type of fiber reinforcement and a second material having a second type of fiber reinforcement, a first material having a continuous fiber reinforcement and a second material having noncontinuous fiber reinforcement, or any combination thereof. Thermoplastic composite materials that may be joined using the present disclosure may include a thermoplastic composite matrix comprising polyamide (PA), polyamide-imide (PAI), polyarylsulfone (PAS), polyethersulfone (PES), polyoxymethylene (POM), polyphenylene sulphide (PPS), polyether ether ketone (PEEK), polyetherimide (PEI), polyethylene terephthalate (PET), polyphthalamide (PPA), poly ether ketone ketone (PEKK), or poly aryl ether ketone (PAEK), or the like, or any combination thereof. Thermoplastic composite materials that may be joined using the present disclosure may include reinforcement materials such as glass fibers, carbon fibers, aramid fibers, basalt fibers, mineral fibers, fibers from renewable raw materials, metal fibers or polymer fibers, or the like, or any combination thereof.

The cross member 20 ("CM") includes a first CM wall panel 30 and a second CM wall panel 32 that may be substantially parallel one another and a CM connecting panel 34. Each of the first and second CM wall panels 30, 32 has a first end 36 and an opposite second end 38. The first ends 36 of the CM wall panels 30, 32 are disposed contiguous with the back panel 28. The CM connecting panel 34 extends between the first and second CM wall panels 30, 32 at the second ends 38 of the first and second CM wall panels 30, 32. The present disclosure is not limited to the U-shaped cross member 20 shown in the FIGURES.

The cross member 20 further includes a plurality of attachment flanges disposed at each end of the cross member 20. As shown in FIG. 1, the flanges may be mirror images of one another. The plurality of attachment flanges include a first BP flange 40, a second BP flange 42, a first rail side flange 44, a second rail side flange 46, and a rail top flange 48. The first and second BP flanges 40, 42 are disposed at the first ends 36 of the CM wall panels 30, 32 and extend laterally outward. The first and second BP flanges 40, 42 are contiguous with the back panel 28 and will be joined to the back panel 28 as detailed herein. The first rail side flange 44 is disposed on a first side of the cross member 20 and extends laterally outwardly from the cross member 20. The first rail side flange 44 is contiguous with the rail interior side surface 24 and will be joined to the rail interior side surface 24 as detailed herein. The second rail side flange 46 is disposed on a second side of the cross member 20 and extends laterally outwardly from the cross member 20. The second rail side flange 46 is contiguous with the rail interior side surface 24 and will be joined to the rail interior side surface 24 as detailed herein. The rail top flange 48 is disposed on the first side of the cross member 20 and extends outwardly from the cross member 20. The rail top flange 48 is contiguous with the rail top surface 26 and will be joined to the rail top surface 26 as detailed herein.

As can be seen in FIGS. 1-4, the first BP flange 40, the second BP flange 42, and the rail top flange 48 are parallel one another. In this specific example, the first and second BP flanges 40, 42 are coplanar, and the rail top flange 48 is separated from the first and second BP flanges 40, 42 by a distance (along the Z-axis) equal to the height of the rails 22. The first and second rail side flanges 44, 46 are coplanar and are shown perpendicular to the first and second BP flanges 40, 42 and the rail top flange 48.

The cross member 20 described above is a non-limiting example of a part comprising a thermoplastic composite material, which part has at least one surface to be joined disposed in a first plane, and at least one surface to be joined disposed in a second plane, where the first and second planes are non-parallel (e.g., perpendicular). The present disclosure is not limited to the cross member 20 geometry described herein— this geometry is provided for illustration purposes.

As described herein, the vibration welding process involves moving one part in an oscillatory motion (e.g., linear, back-and-forth, reciprocating) relative to a stationary part. The linear motion typically involves an amplitude component (i.e., the stroke), a frequency component (i.e., the speed), and a pressure component (i.e., the amount of force pressing one surface into another). The amplitude and frequency of the movement, and the amount of pressure applied may vary depending upon the geometry of the parts to be joined as well as the material of the parts to be joined. The present disclosure utilizes amplitude, frequency, and pressure settings that are adequate to produce the desired meltdown at the interface of the respective surface or surfaces. The present disclosure is not limited to any particular amplitude, frequency, and pressure settings for the vibration welding.

As indicated above, existing vibration welding techniques of which we are aware do not permit concurrent welding of non-parallel surfaces in a single process. Hence, using existing vibration welding techniques it would not be possible to weld the first and second BP flanges 40, 42 to the back panel 28, the rail top flange 48 to the rail top surface 26 of a respective rail 22, and the first and second rail side flanges 44, 46 to the interior side surface 24 of the respective rail 22 in a single process. The term "single process" as used herein refers to a process where respective welds are produced at the same time; i.e., concurrently.

The present disclosure provides an improved vibrational welding process that permits welding of non-parallel surfaces in a single process. Some embodiments of the present disclosure may utilize an interference fit between parts to be joined to facilitate the joining process. In terms of the example structure described above, the cross member 20 may be configured so that the cross member 20 (or portions thereof) is disposed in an interference fit between the rails 22. More specifically, the cross member 20 as a unitary structure may have some degree of elasticity that causes the first and second rail side flanges 44, 46 to be biased against the interior side surface 24 of each respective rail 22. Alternatively, the first and second rail side flanges 44, 46 may have some degree of elasticity and may be configured so that they are biased against the interior side surface 24 of each respective rail 22 when the cross member 20 is disposed between the rails 22. Regardless of the mechanism that biases the first and second rail side flanges 44, 46 against the interior side surface 24 of each respective rail 22, the amount of biasing force is below that which would inhibit the oscillatory motion required to vibration weld the first and second BP flanges 40, 42 of a given attachment flange to the back panel 28, and the respective rail top flange 48 to the respective rail top surface 26, and the biasing force is at least that necessary to create sufficient meltdown at the interface between the first and second rail side flanges 44, 46 and the respective interior side surface 24 necessary for a vibration weld there between.

In this example, the cross member 20 is subjected to oscillatory motion and the back panel 28 and rails 22 are maintained stationary. Primary force (e.g., pressure) is applied during the vibration welding to the first and second BP flanges 40, 42, and to the rail top flange 48, all of which flanges are parallel one another. The first and second rail side flanges 44, 46 as part of the cross member 20 are also subject to the oscillatory motion, and are biased against the interior side surface 24 of each respective rail 22. The oscillatory motion is maintained until sufficient meltdown is produced at each of the surface interfaces necessary for a vibration weld there between. Once the requisite meltdown is achieved, the cross member 20 is maintained stationary at the appropriate position and therefore the "heat source" (i.e., the oscillatory motion that produces thermal energy as a result of friction between the surfaces to be joined) is removed. Typically, at least part of the primary force and the secondary force (created by the interference fit) are maintained until the melt zone between the surfaces to be joined has cooled and resolidified. Once the melt zone has resolidified to a point where removing the force will not compromise the welded surfaces, the force/pressure can be removed. In terms of those surfaces that were biased together (e.g., the first and second rail side flanges 44, 46 and the respective interior side surface 24 of each respective rail 22), subsequent to the cooling stage there may or may not be some amount of residual interference; e.g., plastic deformation may reduce or eliminate the biasing.

Figure 5:
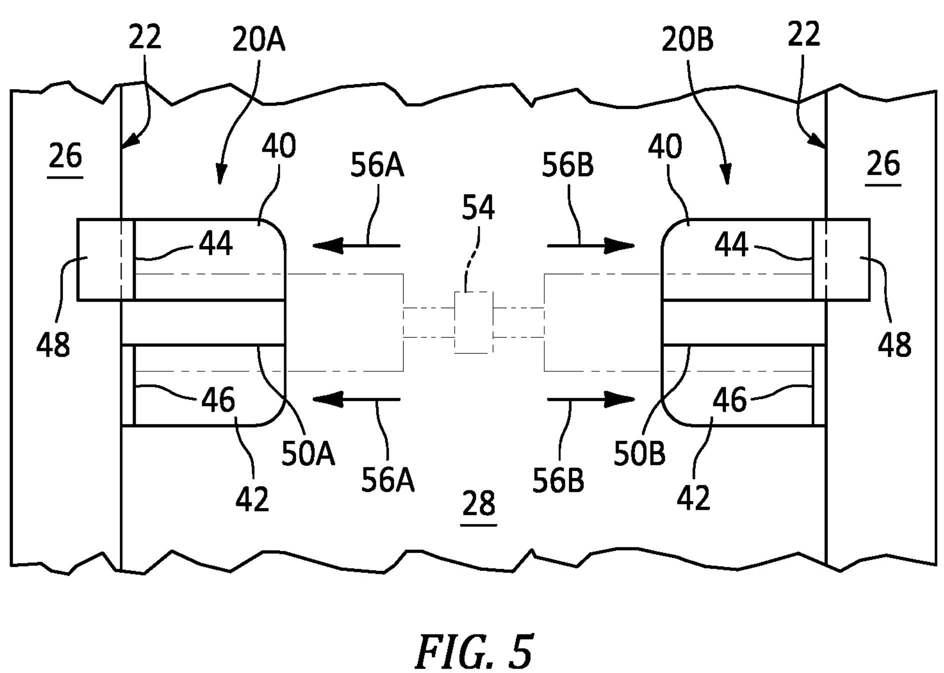
FIG. 5 is a diagrammatic representation of an embodiment of the present disclosure, showing a fixture for loading parts.
Figure 6:
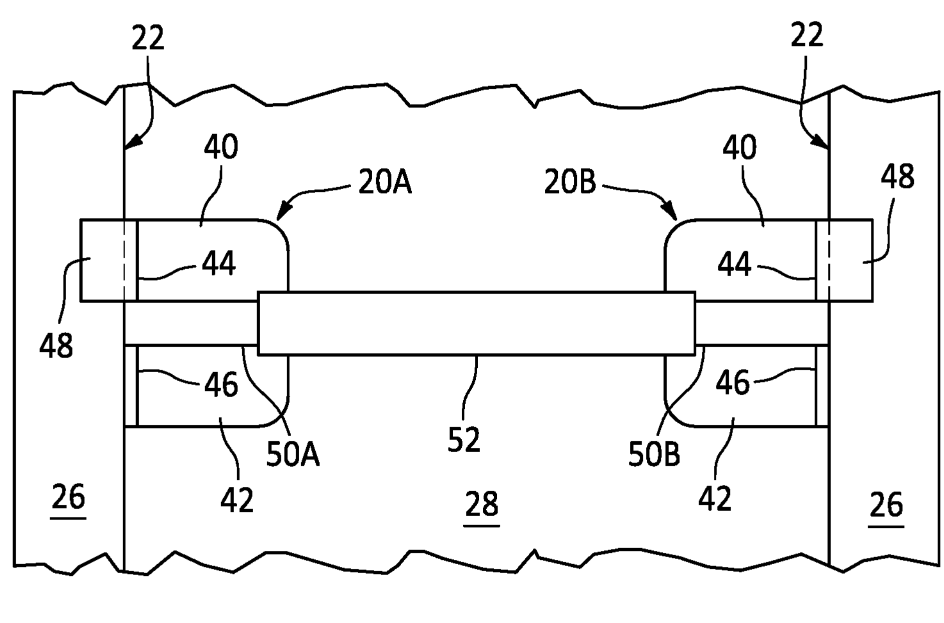
FIG. 6 is a diagrammatic representation of the parts shown in FIG. 5 with a connecting member.

The present disclosure is not limited to using an interference fit to create the force used to produce a vibration weld between the non-parallel surfaces. For example, the cross member 20 examples are described above as a unitary structure. Referring to FIGS. 5 and 6, in alternative embodiments, a cross member 20 may be formed from independent pieces including a first cross member end piece 20A, a second cross member end piece 20B, and a connecting member 52. The cross member end pieces 20A, 20B are each configured in the manner described above; e.g., each cross member end piece having a first BP flange 40, a second BP flange 42, a first rail side flange 44, a second rail side flange 46, and a rail top flange 48, and each also having a respective cross member portion 50A, 50B. The cross member end pieces 20A, 20B may be positioned relative to the rails 22 and the back panel 28 as described above. A fixture 54 (See FIG. 5—shown in dashed lines to avoid obscuring the cross member end pieces) may be placed in communication with the end pieces 20A, and 20B and actuated to produce lateral forces (see arrows 56A and 56B) that create the interference fit described above. Once the lateral forces are applied forcing the first and second rail side flanges 44, 46 in contact with the interior side surfaces 24 of the rails 22, the vibration welding process described above can be utilized to bond the end pieces 20A, 20B to the rails 22 and the back panel 28. FIG. 6 illustrates the end pieces 20A, 20B bonded to the rails 22 and the back panel 28, and the connecting member 52 extending between the end pieces 20A, 20B attached to the cross member portions 50A, 50B.

As is evident from the description above, the present disclosure provides an improved method for vibration welding of thermoplastic parts that can be used to produce welded surface joints that are non-parallel one another in a single process. In particular, the present disclosure provides significant utility when the thermoplastic parts include multiple non-parallel surfaces are to be welded. As stated above, existing vibration welding processes of which we are aware do not permit welding in multiple non-parallel surfaces in a single process. In those applications wherein thermoplastic parts to be combined have complex geometries, it is often the case that conventional vibration welding cannot be used to weld non-parallel surfaces even in multiple steps (i.e., not concurrently). As a result, alternative joining methods must be used that increase the time and cost of fabricating the thermoplastic component. The present disclosure method provides a desirable alternative to existing processes. The cross member 20, rail 22, and back panel 28 structures are provided to illustrate an example of how embodiments of the present disclosure may be used. The present disclosure is not limited to these structural examples.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A method for joining thermoplastic composite parts, comprising:

providing a cross member having at least one first flange disposed in a first plane and at least one second flange disposed in a second plane that is non-parallel to the first plane, the cross member comprising a first thermoplastic composite material;

providing a rail having at least one first joining surface disposed in the first plane and at least one second joining surface disposed in the second plane, the rail comprising a second thermoplastic composite material;

disposing the cross member to the rail so that the at least one first flange and the at least one first joining surface are in contact with one another, and the at least one second flange and the at least one second joining surface are in contact with one another;

forcing the at least one second flange and the at least one second joining surface against one another; and welding the at least one first flange and the at least one first joining surface together using a vibration welding process that includes subjecting one of the cross member or the rail to oscillatory motion;

wherein the oscillatory motion and the forcing of the at least one second flange and the at least one second joining surface against one another causes the at least one second flange and the at least one second joining surface to be welded.

2. The method of claim 1, wherein the oscillatory motion comprises a linear motion, a back and forth motion, and/or a reciprocating motion.

3. The method of claim 1, wherein the at least one first flange is at least one back panel flange, and the at least one second flange is at least one rail side flange.

4. The method of claim 1, wherein the cross member further comprises at least one third flange that is parallel to the at least one first flange.

5. The method of claim 4, wherein the at least one third flange is at least one rail top flange.

* * * * *